United States Patent [19]
O'Connor

[11] 3,759,296
[45] Sept. 18, 1973

[54] CONTROL DEVICE

[75] Inventor: Ward F. O'Connor, Deanville, N.J.

[73] Assignee: The Lummus Company, Bloomfield, N.J.

[22] Filed: Apr. 14, 1971

[21] Appl. No.: 133,915

Related U.S. Application Data

[63] Continuation-in-part of Ser. No. 82,749, Oct. 21, 1970, and a continuation-in-part of Ser. No. 837,673, June 30, 1969.

[52] U.S. Cl. .................. 137/805, 60/39.28, 137/810
[51] Int. Cl. ............................................... F15c 1/16
[58] Field of Search ...................... 60/39.28; 415/1, 415/15, 17; 137/81.5

[56] References Cited
UNITED STATES PATENTS

| | | | |
|---|---|---|---|
| 2,948,114 | 8/1960 | Besher et al. | 60/39.28 R |
| 3,340,883 | 9/1967 | Peternel | 415/15 |
| 3,654,943 | 4/1972 | Rexford | 137/81.5 X |
| 2,941,359 | 6/1960 | Miller et al. | 60/39.28 R |
| 3,416,310 | 12/1968 | Boothe | 60/39.28 R |
| 3,444,873 | 5/1969 | Preli et al. | 415/15 X |
| 3,488,948 | 1/1970 | Cornett et al. | 60/39.28 R |
| 3,587,230 | 6/1971 | Schmidt | 60/39.28 R |
| 3,608,572 | 9/1971 | Hass | 137/81.5 |
| 3,613,369 | 10/1971 | Colston | 137/81.5 X |
| 3,637,319 | 1/1972 | Stratton et al. | 415/1 |

*Primary Examiner*—Samuel Scott
*Attorney*—Marn & Jangarathis

[57] ABSTRACT

This invention relates to control apparatus for equipment, and more particularly to highly reliable fluid control apparatus for governing the various functions of equipment.

8 Claims, 8 Drawing Figures

INVENTOR.
Ward F. O'Connor

Fig. 4.
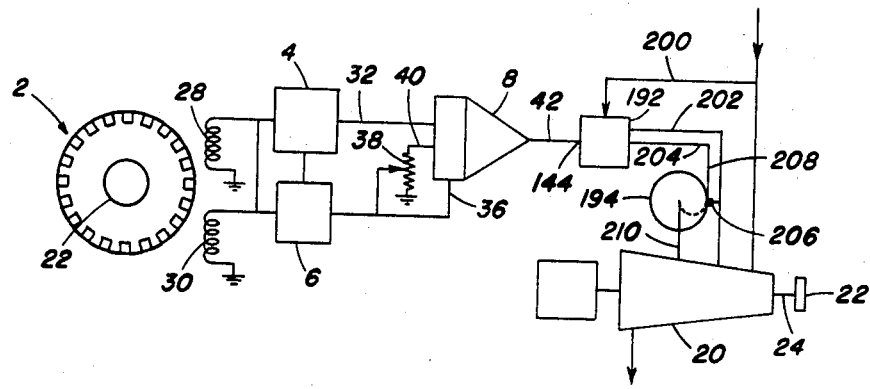
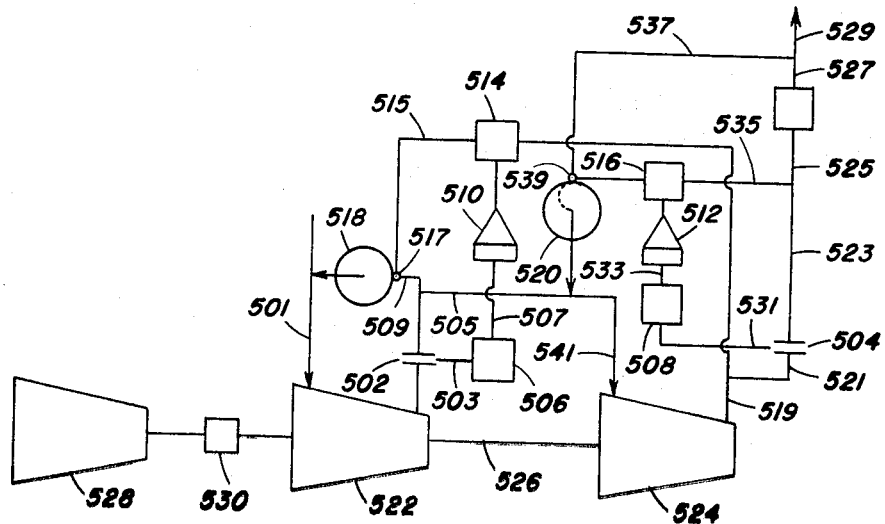
Fig. 5.

CONTROL DEVICE

This application is a continuation-in-part of co-pending application Ser. No. 82,749, filed Oct. 21, 1970 and application Ser. No. 837,673 filed June 30, 1969.

The various functions of rotating equipment, such as turbines, compressors, and the like have been traditionally controlled by the use of conventional extraction or admission valves which act to regulate the fluid flowing to the stages therein located downstream of the extraction or admission opening in the equipment being controlled. The plurality of conventional extraction or admission valves relied upon in such traditional control apparatus are normally sequentially operated, cam actuated devices which allow precise regulation of the fluid admitted or extracted from the rotary equipment to thereby achieve high efficiency and appropriate response to control signals generated by the extraction or admission governing system. However, as the large number of admission or extraction valves relied upon, each generally requiring controlled actuation means therefor, the resultant structure of such traditional control apparatus is normally mechanically complex and includes a large number of moving parts. The same holds true for control apparatus for non-rotating equipment, such as heaters, water drums, steam drums and the like, i.e., mechanically complex including a large number of moving parts. The condition responsive sensing means, the lubricating means and the sealing means utilized in conjunction with typical prior art control apparatus substantially adds to the complex nature of the apparatus relied upon per se to yield resultant apparatus which is extremely expensive to manufacture, operate and maintain. In addition, as control apparatus for rotating equipment is continously subject to vibration, shock and temperature extremes, the normal unreliability of a large number of moving parts is thus increased to a substantial degree whereby adequate reliability for large systems is virtually unattainable.

With the advent of pure fluidic elements, it became possible to provide highly reliable control apparatus for moving fluids because these elements do not employ any mechanically moving parts and are substantially insensitive to vibration, shock and temperature extremes. In addition, the absence of moving parts, as well as parts undergoing self deterioration, have rendered these devices highly advantageous for use in control applications because their useful lives are not limited as is the case when mechanical apparatus is employed. However, though the foregoing attributes of pure fluidic elements are commendable in control applications, for solving prior art problems, their principal advantage is the speed with which they may respond to a detected condition and their inexpensive character when viewed from the manufacturing, operating and maintenance standpoints. Thus, pure fluidic elements have been widely adapted to serve in control applications as well as in logical roles.

The adaptation of pure fluidic elements for the control of equipment has not progressed to a point wherein the full advantages of pure fluidic elements has been fully realized because the control techniques proposed thus far have generally had to rely upon relatively complex control schemes utilizing a large number of fluid logic elements to achieve the necessary modulation over the flow or power of the primary flow fluid whereby the inherent simplicity of the pure fluidic element is defeated. In addition, such proposed control techniques have generally adopted unwieldly acoustic fluid signal generation techniques for supplying control signals to the fluid logic elements where such signals are unavailable in a pure fluid form to thereby further defeat the inherent simplicity and reliability which should inure to apparatus incorporating fluidic elements. Thus, it is seen that presently proposed apparatus for controlling equipment that incorporates pure fluidic elements therein has not resulted in the highly reliable, simplified appatatus anticipated when the pure fluidic elements were initially appropriated for such apparatus.

Recently, however, fluidic elements known as vortex amplifiers have been developed and refined to the point of practicality. These devices retain the high reliability, control speed, insensitivity to environmental conditions and the inexpensive nature common to most pure fluidic elements; however, in addition thereto, they are capable of modulating the flow and power of primary flow over a wide range which extends from full output to a lower level of below 10% of full output. Thus, these devices are considered to be particularly well adapted for combination into control apparatus for rotating equipment.

Therefore, it is an object of this invention to provide highly reliable control apparatus for displacement and rotating equipment which includes vortex amplifier means. Another object of this invention is to provide a highly reliable control apparatus for rotating equipment which includes vortex amplifier means therein for directly or indirectly modulating the flow and power of a primary flow to thereby control the desired function of rotating equipment. Various other objects and advantages of the invention will become clear from the following detailed description of several embodiments thereof, and the novel features will be particularly pointed out in the appended claims.

In accordance with this invention, control apparatus for equipment is provided wherein the condition of the desired function to be controlled is monitored and signals representative of this condition are produced, the signals thus produced are then compared to a reference signal level and thereafter the difference therebetween is applied to the control orifice of one or more vortex amplifier means whose primary flow directly or indirectly controls the desired function. The invention will be more clearly understood by reference to the following detailed description of several embodiments thereof in conjunction with the accompanying drawings, in which:

FIG. 1 schematically illustrates a first embodiment of the control apparatus according to this invention wherein the function of the rotating equipment controlled is the rotational speed thereof;

FIG. 2 schematically illustrates a second embodiment of control apparatus in accordance with the teachings of this invention wherein the function of the rotating equipment controlled is the fluid extraction therefrom;

FIG. 4 depicts a further embodiment of this invention wherein the interstage speed of multi-stage equipment is controlled;

FIG. 5 illustrates an additional embodiment of the control apparatus in accordance with the teaching of this invention wherein minimum flow, anti-surge control is exercised;

Figure 1:
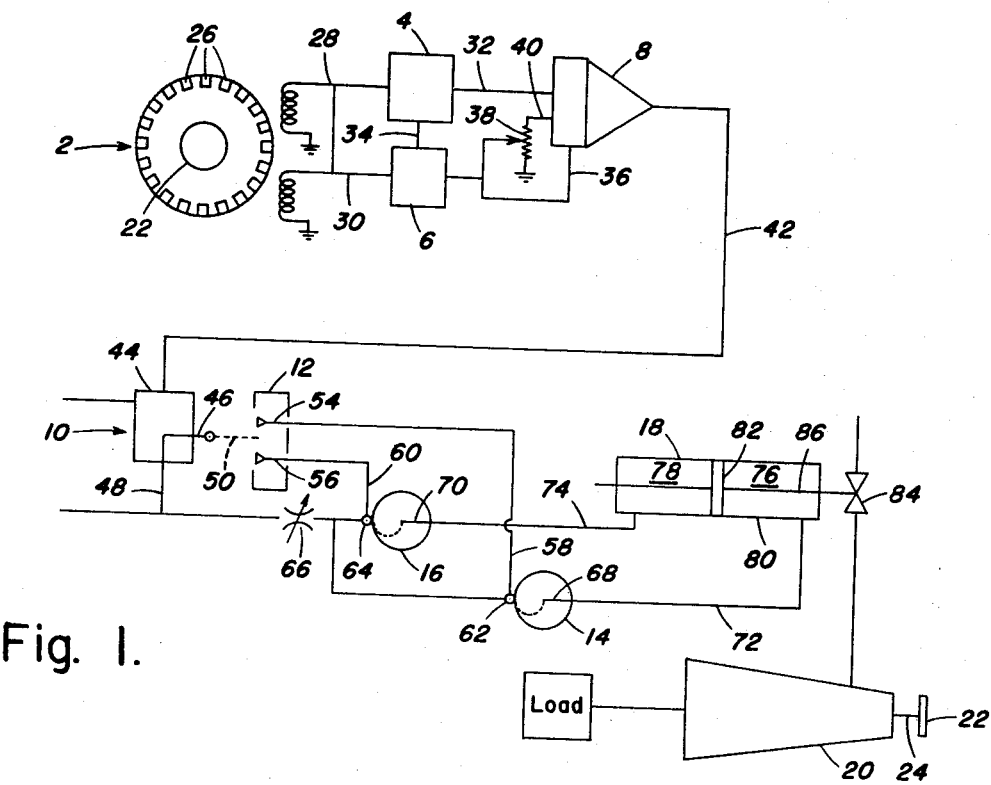

Referring now to the drawings, and more particularly to FIG. 1 thereof, there is shown a schematic representation of a first embodiment of the control apparatus according to this invention wherein such control apparatus is relied upon to control the rotational speed of rotating equipment. The apparatus depicted in FIG. 1 comprises a tachometer-generator combination, generally indicated as 2; frequency converter means 4; power supply means 6; controller means 8; electrofluidic transducer means; generally indicated as 10; distributor block means 12; vortex amplifier means 14 and 16; fluid operated valve controller means 18; and the rotating equipment to be driven, generally indicated as 20. On the tachometer-generator combination 2, there is shown a generator portion 22 mounted for rotation on shaft 24 of the rotating equipment 20, which is here illustrated as being a turbine. In addition, the generator portion 22 of the tachometer-generator combination 2 has been shown in the upper left hand portion of FIG. 1 so that its operative relationship with the electronic portion of the apparatus depicted in FIG. 1 may be readily observed. The tachometer-generator combination 2 is preferably of the contactless variety as shown in FIG. 1, so that no mechanical connections need be incorporated therein. Therefore, as shown in FIG. 1, the generator portion 22 of the tachometer-generator combination 2 has a plurality of discrete poles of permanent magnetic material or bar magnets 26 mounted about the circular periphery thereof which act as poles so that upon rotation of shaft 24 and hence the generator portion 22 of the tachometer-generator combination 2, a varying magnetic field will be produced at discrete locations about the periphery of the generator portion 22. The varying magnetic field thus produced may be sensed by coils appropriately located about the periphery of the generator portion 22 whereby the the voltages induced in such coils may be relied upon to power devices external thereto as well as to indicate the rotational speed of the generator portion 22 and hence the shaft 24.

Although a plurality of coils may be positioned about the periphery of the generator portion 22 of the tachometer-generator combination 2 or on one or both sides thereof, only two such coils 28 and 30 have been shown in FIG. 1. Coils 28 and 30 may be used jointly to provide power and frequency to represent speed. For example the coil 28 is utilized to sense the rotational speed of the generator portion 22 and thus the rotational speed of the rotating equipment 20. The coil 28 is connected to the input of the frequency converter means 4 which may take any of the well-known forms of such devices that produce an electrical output whose magnitude is proportional to the frequency of the input thereto. The output of the frequency converter means 4, which is an electrical level representative of the speed of the rotating equipment 20, is then applied to a first input terminal 32 of controller means 8. The controller means 8 may take any of the well known forms of different amplifier means presently available, however, it has been found preferable for the purposes of this invention that the controller means 8 include on operational amplifier which is capable of a form of rate action control so that the sensitivity of the control exercised by the control apparatus according to this invention may be selectively enhanced depending upon the rate at which the error sensed is changing.

The coil 30, is relied upon to supply power for the control apparatus depicted in FIG. 1, is connected to the power supply means 6 wherein alternating voltage induced in the coil 30 by the rotation of the generator portion 22 energizes the power supply means 6. The power supply means 6 may be any standard form power supply which is readily available and has a sufficient output to energize both the frequency converter means 4, and the controller means 8 connected thereto via electrical conductors 34 and 36, respectively. In addition, the power supply means 6 is also connected to a set point control 38 of the controller means 8. Although any convenient arrangement may be used, the set point control 38 has been shown, in the usual manner, as a potentiometer connected to the second input terminal 40 of the controller means 8 whereby the electrical signal level applied thereto and hence the speed of the rotating equipment 20 may be set at desired level. Therefore, it will be seen that the controller means 8 receives a first input signal at first input termal 32 representative of the actual speed of the rotating equipment 20 and a second input at input terminal 40 representing the desired speed of rotation of such rotating equipment and presents output signals indicative of the correction of the difference between such input signals to conductor 42.

The conductor 42 supplies the electrical output signals provided by the controller means 8 to the electrical input 44 of the electrofluidic transducer means 10, which may take any of the forms well known to those of ordinary skill in the art, transduces the signals supplied thereto into fluid signals representative thereof. The signals provided to the electrical input 44 of the electrofluidic transducer means 10 may comprise either positive or negative electrical signals of varying magnitudes, wherein a positive signal may be considered for the purposes of this description to represent the condition wherein the speed of the rotating equipment 20 is excessive and a negative signal may be considered to represent the condition wherein the speed of the rotating equipment 20 is too slow.

The electrofluidic transducer 10 is illustrated in FIG. 1 as including a jet pipe 46 which is connected to the system supply at 48 and is appropriately biased in the well-known manner so that when a zero electrical input signal is applied to the electrical input 44 thereof the fluid output of the jet valve 46, the fluid will be directed along the dashed path 50. However, when an electrical input signal applied to electrical input terminal 44 is negative, the fluid from the jet valve 46 will be directed upwardly from the path described by dashed path 50 according to the magnitude of said negative signal while, when an electrical input signal applied to the electrical input terminal 44 is positive, the fluid from the jet valve 46 will be directed downwardly from the path indicated by the line 50 in accordance with the magnitude of such positive signal. The fluid from the jet valve 46 is directed towards the distributor block means 12 containing flow passages 54 and 56. The electrically controlled transducer means 10, in combination with the distributor block means 12, acts as a proportional device whereby the fluid impingent on each of the flow passages 54 and 56 depends upon the magnitude and direction of the electrical input signals applied to the transducer means 10 by the controller means 8. Thus, in the absence of an electrical input signal at terminal 44, the fluid from the jet valve 46 apportions itself equally between the pair of flow passages 54 and 56. When an electrical signal is applied to the electrofluidic control means 10 through terminal 44, the fluid emanating from jet nozzle 46 will be deflected in response to the magnitude and polarity of the input signal thereby causing flow passages 54 and 56 to receive unequal portions of the fluid. Although the electrofluidic transducer 10, as illustrated in FIG. 1, has been shown containing a jet valve 46 whose directivity is controlled by the polarity and magnitude of the electrical input signal applied thereto, it should be apparent that the fluidic output of the electrofluidic transducer 10 could alternatively terminate in a pair of control nozzles present in an analog fluid amplifier means. Under these circumstances, the distributor block means 12 would be unnecessary as the proportional output of an analog and amplifier means as controlled by the electrofluidic transducer means would serve to distribute the flow of the power fluid and this apparatus may be directly substituted for that presently shown in FIG. 1.

Each of the flow passages 54 and 56 of the distribution block means 12 is respectively connected to a control port or orifices 58 and 60 of the vortex amplifier means 14 and vortex amplifier means 16, respectively. The vortex amplifier means 14 and 16 may comprise any of the well-known forms of these devices commonly known to those of ordinary skill in the art wherein a primary flow is modulated by the presence of a tangentially applied control flow which will create a vortex within the device to thereby reduce the output flow or outlet power flow thereof in relation to the magnitude of said control flow. In addition, the vortex amplifier means 14 and 16 may be vented or non-vented devices depending upon whether power modulation or flow modulation is desired. In the instant embodiment, vented vortex amplifier means are preferred so that power modulation may be varied from zero to maximum; arbitrary power restrictions are not imposed on the system due to the vortex amplifier means and the vortex may be appropriately isolated from downstream impedance changes.

Although any suitable fluid may be used for the power stream of vortex amplifier means, in the apparatus illustrated in FIG. 1, the vortex amplifier means 14 and 16 are each conveniently connected at the supply ports 62 and 64 thereof, respectively, to the system supply through a variable restrictor 66 which controls the input pressure of the primary flow. In addition, each of the vortex amplifier means 14 and 16 are provided with an output port 68 and 70, respectively, whose orifice size is substantially smaller than the orifice size of the supply port 62 and 64, respectively, whereby when no vortex is generated by fluid tangentially introduced at the control ports, the output port flow rate or outlet power flow is governed by the size of the output orifice, while when a control flow is applied, the outlet flow rate or outlet power flow, in the case of the preferred embodiment, is governed by the radial pressure gradient which exists in the vortex and the vent design. The output orifices 68 and 70 of the vortex amplifiers 14 and 16, respectively, are connected via appropriate fluid communicating conduits 72 and 74, respectively, to opposing chambers 76 and 78, respectively, of the fluid operated valve means 18.

The fluid operated valve means 18, as indicated in FIG. 1, is comprised of a cylinder 80, a piston 82, and an inlet control valve 84. The cylinder 80, which is appropriately vented, is divided into opposing chambers 76 and 78 by the piston 82. The piston 82 is adapted, in the well-known manner, to be variably applied to the opposite surfaces thereof by the opposing chambers 76 and 78. A contact rod 86 is mounted on the piston 82 and is connected in a well-known manner to an inlet valve 84 to thus control the fluid to pass therethrough to the inlet portion to thereby control the amount of motivating fluid introduced into rotating equipment 20. While the valve means 18 has been illustrated as having a linear piston, it is understood that a rotary piston could also be provided. Accordingly, it will be seen that the embodiment of the control apparatus for governing the rotational speed of rotating equipment requires no external power supply for the energization thereof, may function in conjunction with any available fluids, and utilizes a minimum of moving parts.

In the operation of the embodiment of the control apparatus for governing the rotational speed of rotating equipment as depicted in FIG. 1, it may initially be assumed that the rotating equipment 20, which is here illustrated as a turbine, is operating and that the set point control 38 of the controller means 8 has been positioned for a desired rotational speed. Accordingly, the rotating equipment 20 will cause the shaft 24 to rotate at the same rotational speed whereby the generator portion 22 of the tachometer-generator combination 2 is driven at the angular velocity of the shaft 24. The rotating magnet poles 26 mounted about the circular periphery of the generator portion 22 of the tachometer-generator combination 2 will induce, in the well-known manner, an alternating voltage in the coils 28 and 30 which are placed at discrete locations about the generator portion 22 in a manner to link the varying magnetic field produced by the rotating magnet poles 26.

The alternating voltage present in coil 30 is applied directly via the conductor shown, to the input of the power supply means 6, which as previously stated may take the form of any standard power supply having a sufficient output to energize both the frequency converter means 4 and the controller means 8. The power supply means 6 thus energized by the alternating voltage present in coil 30 as applied to the input thereof generates an electrical signal at the outputs thereof which signal is applied over conductors 34 and 36 to thereby energize the frequency converter means 4 and the controller means 8, respectively. In addition, the output of the power supply means 6 is also applied to the set point control 38 of the controller means 8. The set point control 38 of the controller means 8, as previously mentioned, may take the form of a potentiometer as shown connected to a second input 40 to the controller means 8. The electrical signal applied to the set point control 38 is appropriately divided by the potentiometer in accordance with the rotational speed selected by the positioning of the variable position tap thereon, to reduce the magnitude of the electrical signal level to reflect the desired rotational speed applied to the second input 40 of the controller means 8. Thus, the alternating voltage received by the coil 30 is used to energize the power supply 6 which in turn energizes the remainder of the electrical portions of the control apparatus, as depicted in FIG. 1. Furthermore, the power available at the outputs of the power supply 6 is suitably divided by the potentiometer present in the set point control 38 and applied to the second input of the controller means 8 to thereby act as the reference potential against which the controller may compare the actual speed of the rotating equipment being controlled.

The alternating voltage present in coil 28 is aplied via a conductor to the input of the frequency converter means 4. The frequency converter means 4, as previously mentioned, may take any well-known form of such devices which produce an output whose magnitude is proportional to the frequency of the alternating voltage applied thereto. Therefore, it will be seen, that the magnitude of the output of the frequency converter means 4 will be governed by the frequency of the alternating voltage input applied thereto by the coil 28 which frequency is strictly dependent upon the angular velocity of the generator portion 22 of the tachometer-generator combination 2 and hence the rotational speed of the rotating equipment. The output of the frequency converter means 4 is applied to the first input 32 of the controller means 8 to thus supply the first input 32 of the controller means 8 with a signal level whose magnitude is representative of the rotational speed of the rotating equipment presently being controlled. Accordingly, the first input 32 and second input 40 to the controller means 8 receive signal levels whose magnitudes represent the actual rotational speed of the rotating equipment, and the desired rotational speed of the rotating equipment, respectively.

The controller means 8 which, as aforesaid, may take any of the well-known forms of different amplifiers, but preferably includes an amplifier exhibiting a form of rate action to thereby selectively enhance the response of the controller means 8, acts in the well-known manner to algebraically subtract the input signal levels applied thereto and present this difference in the form of a representative signal level on the conductor 42 connected to the output thereof. The rate action control included within the controller means 8 acts in the well-known manner to enhance the output of the operational amplifier present in the controller means 8 so that the output of the operational amplifier will be increased for rates of change in the input signals applied thereto which exceed a selected time constant. Thus, the rate action control will cause the controller means 8 to over respond to the rates of change which exceed a preselected value whereby the level of the output of the controller means 8 will be disproportionately high for such rates of change and hence initiate compensation at a relatively high level. Thus, the output of the controller means 8 is representative of the difference between the actual rotational speed of the rotating equipment, as applied to the first input 32 thereof, and the desired rotational speed of the rotating equipment, as represented by the set point level applied to the second input 40, whereby the magnitude of the output of the controller means 8 is representative of the magnitude of such difference and the polarity of the output of the controller means 8 is indicative of which of the input thereto is larger. Accordingly, a positive polarity may be arbitrarily selected for the case where the actual speed of the rotating equipment 20 exceeds the desired speed thereof while a negative polarity indicates that the converse obtains.

The output of the controller means 8, as present in conductor 42, is applied to the electrical input 44 of the electrofluidic transducer means 10 which as mentioned above includes a biased jet pipe 46 which connects to the system fluid supply at 48. The jet pipe 46 is biased in the well-known manner such that when no output signal is present on line 42 and hence none is applied to the electrical input 44 of the electrofluidic transducer means 10, the fluid output of the jet valve is directed along the dashed path 50 whereby the fluid output of jet nozzle 46 apportions itself equally between the flow passages 54 and 56 of the distributor block means 12. However, when an electrical output is present on line 42 and hence applied to the electrical input terminal 44 of the electrofluidic transducer means 10, the flow path of the power fluid emanating from the jet nozzle 46 will be appropriately deflected in accordance with the magnitude and polarity of such electrical output to unequally apportion itself between the flow passages 54 and 56 of the distributor block means 12. As the operation of the fluidic portion of the embodimnt of the control apparatus depicted in FIG. 1 will vary depending upon the presence and type of input signal applied to the electrical input 44 of the electrofluidic transducer means 10, the remainder of the description of the operation of the FIG. 1 embodiment will proceed wherein the presence of a particular type of electrical input or the lack thereof is initially assumed and the operation of the fluidic portion of the FIG. 1 embodiment will be explained in relation to the initial conditions thereby postulated.

If it is initially assumed that the actual speed of the rotating equipment 20 is equal to the desired speed of the rotating equipmnt 20, the output of the controller means 8 as applied to conductor 42 will be zero whereby no electrical signal will be applied to the electrical input 44 of the electromechanical transducer means 10. Therefore, as previously stated, the bias present on the jet pipe 46 will cause the fluid output supplied by system fluid supply 48 to be directed along the dashed path 50 whereby the fluid output of the jet nozzle 46 will apportion itself equally between the flow passages 54 and 56 of the distributor block means 12. The flow passages 54 and 56 of the distributor block means 12 are connected to the control ports or orifices 58 and 60 of vortex amplifier means 14 and 16, respectively. Each of the vortex amplifier means 14 and 16 are connected to the system supply through variable restrictor 66 so that the input pressure of the primary flow applied to the supply ports 62 and 64, respectively, may be adjusted and is equal. Furthermore, as each of the vortex amplifier means 14 and 16 are identical in structure, in the absence of differential signal on the control orifices 58 and 60, respectively, the power flow present at the output orifice 58 or 70, respectively, thereof, is the same. Accordingly, since the fluid output of the jet nozzle 46, in the absence of an electrical signal at the input 44, equally apportions itself between the flow passages 54 and 56 of the distributor block 12, the fluidic signals applied to the control orifices 58 and 60, of the vortex amplifier means 14 and 16, respectively, will be equal whereby the vortex and hence the radial pressure gradient established in each of the vortex amplifier means 14 and 16 will be equal. Thus, it will be seen that the power flow present at the output orifices 68 and 70 will be equal in magnitude. The power flow present at the output orifice 68 of the vortex amplifier means 14 is applied to the chamber 76 of the cylinder means 80 to thereby exert a first force directed toward the left on the piston means 82. The power flow present at the output orifice 70 of the vortex means 16 is applied to the chamber 78 of the cylinder means 80 whereby a second force directed toward the right is applied to an opposing surface of the piston means 87. Therefore, as the magnitude of the power flow applied to the opposing sides of the piston means 80 are equal in pressure, and the surface area of each of the opposing faces of the piston means 80 are equal in surface area, equal and oppositely directed forces will be applied to the piston means 80 whereby the position thereof will be maintained constant. Accordingly, as the piston means 80 will not, under these conditions be displaced, the control rod means 86 mounted thereof will not be displaced and hence will not alter the opening of the control valve 84. Consequently, when no electrical input signal is applied to the electrical input 44 of the electrofluidic transducer means 10, the inlet fluid applied to the rotating equipment 20 through the control valve 84 will remain constant whereby the actual rotational speed of the rotating equipment will be maintained at the desired speed of rotation.

If it is now assumed that the actual angular speed of the rotating equipment is less than the desired rotational speed, as selected by the setting of the set point control 38, the controller means 8 will produce an output signal on line 42 whose magnitude is representative of the magnitude of the difference between the actual and desired rotational speed of the rotating equipment and whose polarity is indicative of whether the actual rotational speed is greater or less than the desired rotational speed. Thus, assuming that this condition if indicated by a positive polarity signal on line 42, the positive signal applied thereby to the electrical input 44 of the electrofluidic transducer means 10 will act to appropriately deflect the jet nozzle 46 and hence the flow path of the power fluid emanating therefrom in the downward direction from the flow path indicated by the dashed line 50. The power fluid emanating from the jet nozzle 46 under these conditions will thus no longer equally apportion itself between the flow passages 54 and 56 of the distributor block means 12, but a greater proportion, as determined by the magnitude of the electrical signal applied to electrical input 44, of such power fluid will be applied to the flow passage 56 than the flow passage 54. As the flow passages 54 and 56 of the distributor block means 12 are connected to the control ports or orifices 58 and 60, respectively, of the vortex amplifier means 14 and 16, respectively, the larger signal applied to the control orifice 60 of the vortex amplifier means 16 will create a greater radial pressure therein than the smaller signal applied to the control orifice 58 will create in the vortex amplifier means 14. Accordingly, since the vortex thus established in the vortex amplifier means 16 will be greater than the vortex created in the vortex amplifier means 14; the power flow present at the output orifice 70 of the vortex amplifier means 16 will be less than the power flow present at the output orifice 68 of the vortex amplifier means 14. Therefore, when the power flows present at the output orifices 68 and 79 are applied to the chambers 76 and 78, respectively, of the cylinder means 80, oppositely directed forces will be created on opposite sides of the piston means 82. Since the power flow applied to chamber 76 will be greater than the power flow applied to chamber 78, the differential force created on the piston means 82 will tend to drive said piston means to the left, whereby the control valve means 84 will tend to open. As the control valve means 84 is opened, the motive fluid introduced into the turbine means 20 will be increased thereby increasing the rotational speed of the turbine means 20. As is apparent, this control action will continue until the actual rotational speed of turbine means 20 is equal to the desired speed, as set by the set point means 38, whereat no output signal will be present at the output of the controlling means 8, the control signal applied to control orifices 58 and 60 of the vortex amplifier means 14 and 16, respectively, will be equal, and the oppositely directed forces applied to each side of the piston means 82 are rendered equal. Thus, it will be seen that where the actual speed of the rotating equipment 20 is less than the desired rotational speed thereof, the embodiment of the control apparatus depicted in FIG. 1, will act in a positive manner to increase the quantity of driving fluid applied to the rotating equipment and thereby correct the detected condition.

Finally, if the third possible condition is assumed wherein the actual angular speed of the rotating equipment is greater than the desired rotational speed, as selected by the setting of the set point control 38, the controller means 8 will produce an output signal on line 42 whose magnitude is representative of the magnitude of the difference between the actual and desired rotational speeds of the rotating equipment and whose polarity is indicative of whether the actual rotational speed is greater than the desired rotational speed. Thus, maintaining consistent relationships with the polarities adapted previously, the third condition here assumed will be indicated by a negative polarity signal on line 42. The negative polarity signal present on line 42 will be applied thereby to the electrical input 44 of the electrofluidic transducer means 10 which is responsive thereto, in the well-known manner, to appropriately deflect the jet nozzle 46 in the upward direction whereby the power fluid emanating therefrom will deviate in the upward direction from the flow path indicated by the dashed line 50. The power fluid emanating from the jet nozzle 46, under these conditions, will thus no longer equally apportion itself between the flow passages 54 and 56 of the distributor block means 12, but a greater proportion thereof, as determined by the magnitude of the electrical signal applied to the electrical input 44, of the power fluid will be applied to the flow passage 54 than the flow passage 56. As the flow passages 54 and 56 of the distributor block means 12 are connected to the control parts or orifices 58 and 60, respectively, of the first and second vortex amplifier means 14 and 16, respectively, it will be seen that under these conditions a greater vortex will be established in vortex amplifier means 14 than in vortex amplifier means 16. Accordingly, the differential power flows present at the output orifices 68 and 70 of the vortex amplifier means 14 and 16, respectively, will create a greater force on the surface of piston means 82 which faces the chamber 78 of the cylinder means 80 then the oppositely directed force established on the surface of the piston means 82 which faces the chamber 76. Therefore, the piston means 82 will tend to be displaced toward the right, whereby the control valve means 84 will be closed to thus reduce the quantity of motive fluid to the turbine means 20 to thereby decrease the rotational speed thereof. The piston means 82 will, under these conditions, continue to displace until the actual rotational speed of the turbine means 20 reaches the desired rotational speed whereupon the output of the controller means 8 and hence the differential forces placed upon the piston means 82 will terminate. Thus, it will be seen that when the actual rotational speed of the rotating equipment is greater than the desired rotational speed thereof, the embodiment of the control apparatus depicted in FIG. 1 will rapidly respond to the detected condition to decrease the quantity of motive fluid applied to the rotating equipment 20 thus quickly correct the detected condition.

Although the embodiment of the speed control apparatus depicted in FIG. 1 has been illustrated as a self-powered system requiring no external power source, it will be apparent, that an external power source may be utilized in place of the power source 6. Furthermore, although the control apparatus depicted in FIG. 1 has been illustrated in conjunction with rotating equipment wherein a motive fluid directly controls the rotational speed thereof, it will be manifest that in rotating devices which rely upon a fluid fuel supply, the amount of fluid admitted can be regulated in lieu of a motive fluid.

As the additional embodiments of this invention illustrated in FIGS. 2—8 each comprise a substantial amount of apparatus which may be common in form and function to that already described in conjunction with the FIG. 1 embodiment described above, when applicable in the description of such additional embodiments which follows, previously utilized reference numerals will be retained to denote the apparatus and the detailed mode of operation of such like apparatus will not be restricted.

Figure 2:
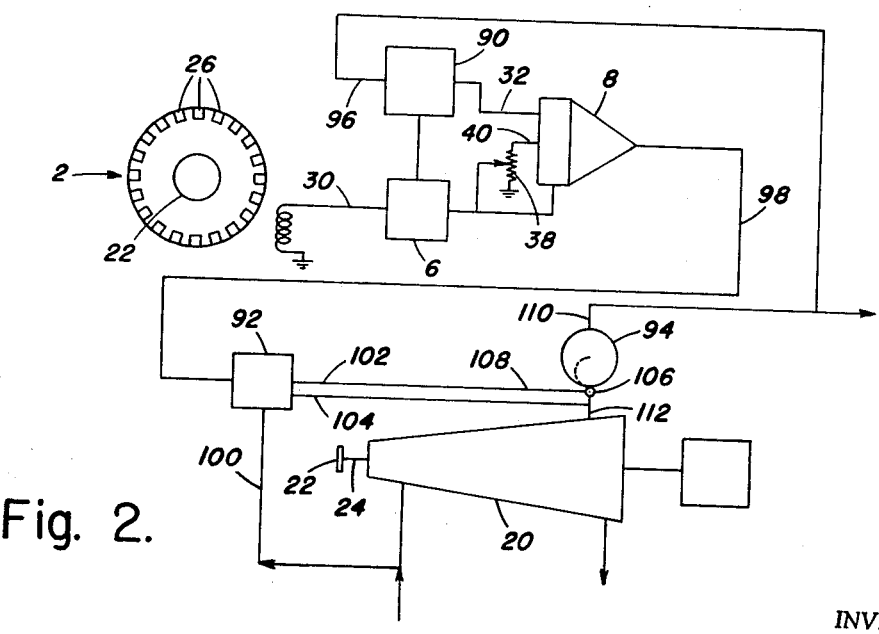

Turning now to FIG. 2, there is shown a second embodiment of a control apparatus in accordance with the teachings of this invention wherein the function of the rotating equipment controlled is fluid extraction. The control apparatus illustrated in FIG. 2 comprises a tachometer-generator combination 2, power supply means 6, fluidic to electronic transducer means 90, controller means 8, transducer-distributor means 92, vortex amplifier means 94, and the rotating equipment to be driven, generally indicated as 20. The generator portion 22 of the tachometer-generator combination 2 is shown mounted for rotation on the shaft 24 of the rotating equipment 20 to be driven which is again shown as a turbine. In addition, as was the case in FIG. 1, the generator portion 22 of the tachometer-generator combination 2 has been shown in the upper left hand portion of FIG. 2 so that its operative relationship with the electronic portion of the control apparatus depicted in FIG. 2 may be readily observed. The tachometer-generator configuration 2 again is preferably of contactless variety described above, and thus is shown in FIG. 2 as including a plurality of magnetic poles 26 mounted about the circular periphery of the generator portion 22 thereof. In the case of the control apparatus depicted in FIG. 2, however, the tachometer-generator combination 2 is utilized only as a source of electrical energy for the control apparatus and accordingly, only a single coil means 30 shown positioned adjacent to the generator portion 22 thereof.

The mode of operation of the tachometer-generator combination 2 may be precisely the same as that described in conjunction with FIG. 1. The coil 30, which is relied upon to supply power to the electrical portion of the apparatus depicted in FIG. 1, is connected to the power supply means 6 so that the alternating voltage induced in the coil 30 by the rotation of the generator portion 22 may be used to energize the power supply means 6. The power supply means 6 may take the standard form of power supply described with regard to the FIG. 1 embodiment of the present invention and here acts to energize both the fluidic to electronic transducer means 90 and the controller means 8 connected thereto. In addition, the power supply 6 is also relied upon to energize the set point control 38 connected to the input 40 of the controller means 8. The set point control 38, which may take the same form as that described in conjunction with FIG. 1, acts in the well-known manner to supply the second input of the controller means 8 with an electric signal level representative of a desired condition. In the case of the FIG. 2 embodiment, the condition represented by the electric signal level supplied by the set point control 38 is the desired rate of extraction of fluid from the rotating equipment 20.

The fluidic to electronic transducer means 90 may take the form of any of the well-known class of transducer devices which respond to a fluid input signal to produce an electric signal in the desired level representative of such input signal. The electrofluidic transducer-distributor means 92 includes a fluid input terminal means 100 and is adapted to receive fluidic information, in a manner to be hereinafter described, which is representative of the actual rate of fluid extraction from the rotating equipment 20. The fluidic to electronic transducer means 90 is connected to the input 32 of the controller means 8 and thus supplies said controller means 8 with electrical information in the desired form of electrical level. The controller means 8, which may take any of the forms mentioned above, thus receives electrical information representative of the actual rate of extraction at input 32 thereto and information representative of the desired rate of extraction at the second input 40 thereto. The output of the controller means 8 is indicative of the difference between the input signals supplied to the inputs 32 and 40, respectively, and comprises a signal level whose magnitude is representative of the magnitude of the difference between such input signals and whose polarity is indicative of which of the two inputs signals ia larger. The output of the controller means 8 is applied to the conductor 98 which connects to the electrical input of the electrofluidic transducer-distributor means 92.

The electrofluidic transducer-distributor means 92 shown in block form in FIG. 2 may comprise either the electrofluidic transducer means 10 in combination with the distributor block means 12, as shown in FIG. 1, or any of the various combinations of transducer means and proportional devices which may readily be substituted therefor. Accordingly, the transducer-distributor means 92 is illustrated in FIG. 2 as comprising a fluidic input 100, which connects to the system supply so as to furnish a source for the fluid output of the jet nozzle included therein, and first and second output flow passages 102 and 104, respectively, which may be considered as outputs of the distributor block as proportional devices included in the transducer-distributor means 92. The transducer-distributor means 92 can function in the same manner as previously specified for the electrofluidic transducer means in combination with the distributor block means illustrated in FIG. 1, such that in the absence of input signals on conductor 98, equal fluid control signals will be present in flow passages 102 and 104 whereas when input signals are present on conductor 98, the magnitude of the control in flow passages 102 and 104 will be unequal. Furthermore, the differential magnitudes of the control signals present in flow passages 102 and 104 will be determined by the magnitude of the input signals present on conductor 98 and hence the magnitude of the difference between actual and desired rates of extraction while the presence of the larger control signal in one of the flow passages 102 or 104 is determined by the polarity of the electrical signals on conductor 98 and thus, whether the actual rate of extraction exceeds the desired rate or the converse thereof. The second control signals present in the second flow passage 104 are not utilized in the control apparatus depicted in FIG. 2 and therefore, flow passage 104 of the transducer-distributor means 92 is passed to line 112 which acts as a sink. The first flow passage 102 of the transducer-distributor means 92 is connected to vortex amplifier means 94.

The vortex amplifier means 94 may take the form of any of well-known class of devices described in conjunction with the FIG. 1 embodiment of this invention. The vortex amplifier means 94 comprises a supply port 106, a control orifice 108 and output orifice 110 wherein the size of the supply port 106 is larger than output orifice 110 so that the requisite control over the power flow may be exercised by the vortex amplifier 94 in the manner previously described above. The vortex amplifier means 94 in the FIG. 2 embodiment of the present invention acts directly to control the rate of extraction from the rotating equipment 20 and thus the supply port 106 is in fluid communication with the extraction outlet of the rotating equipment 20 while the output orifice 110 is in fluid communication with both the external equipment adapted to receive the extraction fluid and the input to the fluidic to electronic transducer means 90 whereby the latter is in receipt of fluidic information representative of the actual flow rate. The control orifice 108 of the vortex amplifier means 94 is connected to the first flow passage 102 of the transducer-distributor means 92 whereby the control signals present therein determine the vortex generated within the vortex amplifier means 94 and hence the magnitude of the power flow at the output orifice 110 thereof which is equal to the rate of extraction.

In the operation of the embodiment of the control apparatus illustrated in FIG. 2, when the rotating equipment being controlled is energized, the tachometer-generator combination 2 will energize the power supply means 6 in the manner previously explained with regard to the FIG. 1 embodiment. The power supply means 6, thus energized, will in turn supply operating power to the fluid to electronic transducer means 90, the controller means 8 and to the set point control means 38. The fluid to electronic transducer means 90 is in fluid communication at the fluid input 96 thereof with the output orifice 110 of the vortex amplifier means 94 whereupon signals representative of the actual rate of extraction are received at the fluid input 96. The fluid input signals received by the fluid to electronic tranducer means 90 are transduced thereby, in the well-known manner, into an electrical signal representative thereof and applied to the first input of the controller means 8 via the conductor indicated.

The second input 40 of the controller means 8 receives an electric signal level representative of the desired rate of extraction as previously selected by the setting of the set point control means 38. The output of the controller means 8 as applied to the conductor 98, thus represents the difference, if any, between the actual rate of extraction from the rotating equipment 20 and the desired rate therefrom as determined by the setting of the set point control means 38. The transducer-distributor means 92 is connected over conductor 98 to the output of the controller means 8 and is responsive in the manner previously set forth to electrical input signals applied thereto to vary the magnitude of the control signals present in the first and second flow passages 102 and 104, respectively. Accordingly, if no output is present on conductor 98, the control signals present in the first and second flow passages 102 and 104 will remain equal whereupon the control signal applied to the control orifice 108 of the vortex amplifier means 94 will remain constant and hence the vortex established in the vortex amplifier means 94 will remain unchanged. Thus under these conditions, the actual rate of extraction from the rotating equipment will be controlled by the previously established vortex in the vortex amplifier means 94 as such actual rate of extraction is equal to the desired rate of extraction as determined by the set point control means 38. However, if an output is present on the conductor 98, the transducer-distributor means 92 in response to the electrical signals applied thereto will appropriately apportion the power fluid flow controlled thereby between the flow passages 102 and 104 to compensate for the condition detected. Therefore, if it is assumed that a condition is detected by the controller means wherein the actual extraction rate is greater than the desired extraction rate, it will be seen that the magnitude of the control signals in flow passage 102 will be appropriately increased to thus increase the vortex present in the vortex amplifier means 94 to decrease the power flow of the extraction fluid flowing therethrough while the magnitude of the control signals in the flow passage 104 will be decreased. Furthermore, when the actual rate of extraction is less than the desired rate, the converse relationship between the magnitudes of the control signals present in flow passages will obtain whereby the vortex present in the vortex amplifier means 94 will be decreased to thus increase the rate of extraction therethrough. Thus, it will be seen that the embodiment of the control apparatus depicted in FIG. 2 positively acts to maintain the rate of extraction of fluids from rotating equipment at a selectable constant.

Figure 3:
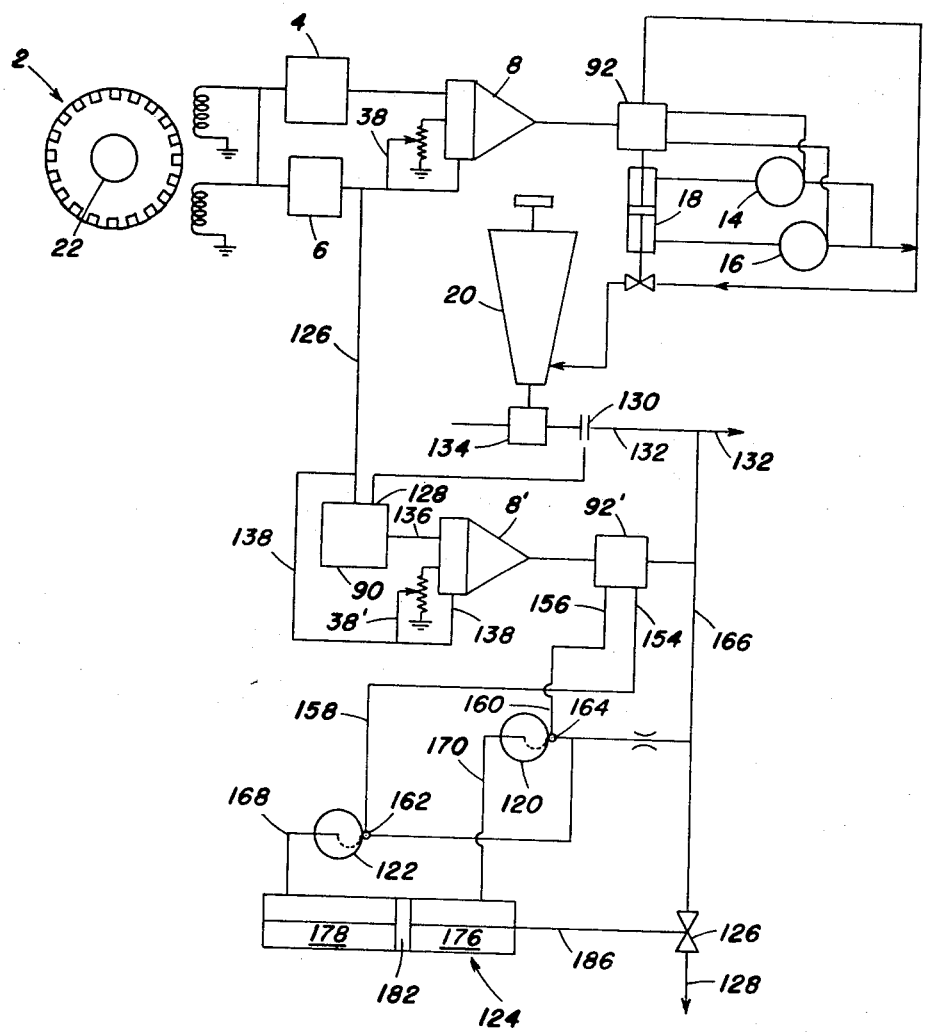
FIG. 3 is a schematic showing of a third embodiment of the control apparatus according to this invention wherein both the rotational speed of the rotating equipment and the minimum flow thereof are controlled.

FIG. 3 is a schematic illustration of a third embodiment of the control apparatus according to this invention wherein both the rotational speed of the rotating equipment and the minimum flow of a pumped fluid are controlled. As shown in FIG. 3, the control apparatus illustrated therein comprises a tachometer-generator combination 2, frequency converter means 4, power supply means 6, first controller means 8, first transducer-distributor means 92, first and second vortex amplifier means 14 and 16, fluid operated valve controller means 18 and the rotating equipment to be driven indicated as 20. As the transducer-distributor means 92 may, as previously indicated with regard to the FIG. 2 embodiment of this invention, comprise an electrofluidic transducer means 10 in combination with distributor block means 12 (as shown in FIG. 1) it will be seen that the elements thus far set forth in regard to the FIG. 3 embodiment of this invention are virtually identical to speed control apparatus disclosed in conjunction with the FIG. 1 embodiment of this invention. In addition, as this portion of the FIG. 3 embodiment of the present invention comprises the speed controller portion of the FIG. 3 embodiment, the structure and operation thereof may be rendered manifest by recollection of the FIG. 1 embodiment. Accordingly, the further explanation of this portion of the FIG. 3 embodiment of this invention is not deemed to require detailed discussion as the manner in which the speed of the rotating equipment 20 is maintained at a desired level will be apparent from the discussion anent the FIG. 1 embodiment.

In addition to the speed controlling portion of the FIG. 3 embodiment of the present invention, a minimum flow controlling portion is included therein which comprises fluid to electronic transducer means 90, second controller means 8', second transducer-distributor means 92', third and fourth vortex amplifier means 120 and 122, and second valve controller means 124. The fluid to electronic transducer means 90 may take the same form of transducer means as was described in conjunction with the FIG. 2 embodiment of this invention and is energized at the electrical input connection thereto by energy supplied by the power source means 6 over conductor 126. The fluid input 128 of the fluid to electronic transducer means 90 receives flow information from a pressure differential detected across the orifice plate 130 present in the conduit 132. The conduit 132 is in fluid communication with a load 134 which is driven by the rotating equipment 20 and has a pumped fluid flowing therein that is to be measured for minimum flow. The fluid to electronic transducer means 90 is thus in receipt of information indicative of the actual flow rate present in the conduit 132 and transduces this information into a representative electric signal level in the well-known manner.

The output of the fluid to electronic transducer means 90 is applied to the first input 136 of the second controller means 8' over the conductor illustrated in FIG. 3. The second controller means 8' as well as the second set point control means 38' are each connected by conductors 126 and 138 to the power supply means 6 and thus each receive energizing potential therefrom. The second set point control means 38' is connected to the second input 138 of the second controller means 38' and thus applies a signal level to the second controller means 38' which is representative of the desired minimum rate of flow of the fluid through conduit 132. The signal indicative of a difference between the input to second controller means 38' is supplied to the transducer-distributor means 92' which transduces the signal supplied thereto into fluid signals representative of such difference.

Since in the instant embodiment, it is desired to maintain the total flow of a fluid through the conduit 132, unless the total flow drops below the predetermined value as established by the set point control means 38' at which conditions it is desired to vent the fluid through valve 126 via conduit 128. Consequently, when the flow of the fluid through the conduit 132 is above the predetermined minimum flow; a signal will issue from the second controller means 8' indicating a difference between the predetermined minimum flow rate as set on controller means 38' and the actual flow rate as sent to second controller means 8' from the fluid to electronic transducer means 90. The differential signal is supplied to transducer-distributor means 92', which may take the form of such similar devices described with reference to the previous Figures. The flow passages 154 and 156 of the transducer-distributor means 92' are connected to the control ports or orifices 158 and 160, respectively, of the vortex amplifier means 122 and 120, respectively.

Each of the vortex amplifier means 120 and 122 are connected to the system supply through line 166 to the supply ports 164 and 162, respectively. As each of the vortex amplifier means 122 and 120 are identical in structure, in the absence of differential signal on the control orifices 158 and 160, respectively, the power flow present at the output orifices 168 and 170, respectively thereof, is the same. The power flow present at the output orifice 170 of the vortex amplifier means 120 is applied to the chamber 176 of the valve controller means 124 to thereby exert a first force directed toward the left on the piston means 182. The power flow present at the output orifice 168 of the vortex amplifier means 122 is applied to the chamber 178 of the cylinder means 124 whereby a second force, directed toward the right is applied to an opposing surface of the piston means 182. The piston means 182 of the valve control means 124 is connected by a shaft 186 to valve 126.

Under the assumed condition that this flow rate through conduit 132 is above the minimum flow rate established by the set point 38', a signal is passed to transducer-distributor means 92' which results in an unequal apportionment of the fluid between flow passages 154 and 156, with the radial pressure gradient in the vortex amplifier means 120 being greater than the radial pressure gradient in the vortex amplifier means 122. Thus, the power flow present at the output orifice 170 of the vortex amplifier means 120 will be less than the power flow present at the output orifice 168 of the vortex amplifier means 122, thereby resulting in a greater force in chamber 178 than in chamber 176 of the valve control means 124. This differential force causes the piston means 182 of the valve control means 124 to be displaced to the right thereby maintaining the valve 126 in a closed condition.

Should the flow rate through conduit 132 drop below the predetermined minimum flow rate set at the controller means 38', a signal indicative of such state will issue from the second controller means 8' to the transducer-distributor means 92', which signal will increase the amount of fluid subsequently passing through the flow passage 154 as compared to the condition where the fluid flow in conduit 132 is above the minimum fluid flow rate. With an increase in the radal pressure gradient in the vortex amplifier means 122 accompanied by a decrease in the radial pressure gradient in the vortex amplifier means 20, the power flow present at the output orifice 168 of the vortex amplifier means 122 will be lessened with an increase in the power flow at the output orifice 170 of the vortex amplifier means 122. Consequently, the force of the fluid in the chamber 178 will be reduced while the force of the fluid in the chamber 176 is increased causing the piston means 182 to be displaced to the left thereby opening the valve 126 operatively connected to the piston means 182 by rod 186 with fluid thereafter being passed through conduit 128. Thus, it is seen that the embodiment of the control apparatus of FIG. 3 relates to the controlling of both the rotational speed of such apparatus and also to the controlling of the minimum flow rate of fluid being pumped by rotating equipment.

Referring now to FIG. 4, there is illustrated an embodiment of a control apparatus according to the invention wherein the rotational speed of a rotating equipment is controlled by throttling the flow of steam to an interstage of the rotating equipment. FIG. 4 comprises a tachometer-generator combination, generally indicated as 2; frequency converter means 4; power supply means 6; controller means 8; transducer-distributor means generally indicated as 192; vortex amplifier means 194; and the rotating equipment to be controlled, generally indicated as 20. The tachometer-generator combination 2 includes a generator portion 22 mounted for rotation on shaft 22, and functions to provide a source of power as well as to indicate the rotational speed of the rotating equipment 20 as herein above described with reference to FIG. 1. Coils 28 and 30 are positioned about the periphery of the generator portion 22 of the tachometer-generator combination 2. It is understood, however, that a plurality of coils may be positioned about the periphery of the combination 2. The coil 28 is utilized to sense the rotational speed of the rotating equipment 20. The coil 28 is connected to the input of the frequency converter means 4 which may take any of the well-known forms of devices that produce an electrical output whose magnitude is proportional to the frequency of the input thereto. The output of the fequency converter means 4 (signal level representative of the speed of the rotating equipment 20) is then applied to a first input terminal 32 of controller means 8. The controller means 8 as hereinbefore described includes an amplifier which is capable of rate action control so that the sensitivity of the control exercised by the control apparatus according to this invention may be selectively enhanced depending upon the rate at which the error sensed is changing.

The coil 30 is connected to the power supply means 6 wherein alternating voltage induced in the coil 30 by the rotation of the generator portion 22 energizes the power supply means 6. The power supply means 6 may be any standard form of power supply readily available having a sufficient output to energize both the frequency converter means 4, and the controller means 8 connected thereto via electrical conductors 34 and 36, respectively. The power supply means 6 is also connected to a set point control 38 of the controller means 8 and is shown as a potentiometer connected to the second input terminal 40 of the controller means 8 whereby the signal level applied thereto and hence the speed of the rotating equipment 20 may be set at a desired level. Thus, the controller means 8 receives a first input signal at input terminal 32 representative of the actual speed of the rotating equipment 20 and a second input at input terminal 40 representative of the desired speed of rotation of the rotating equipment 20. The output signal to conductor 42 from the controller means 8 is indicative of the difference between such input signals.

The conductor 42 supplies the electrical output signal to the electrical input 144 of the transducer-distributor means 192, which may take any of the forms well-known to those of ordinary skill in the art, as hereinbefore discussed with reference to FIG. 2. The transducer-distributor means 192 comprises a fluid input 200, which is connected to the system supply furnishing a source for the fluid output of the jet nozzle included therein and includes a single output flow passage 204.

The vortex amplifier means 194 may take the form of any of well-known class of devices hereinbefore described, and comprises a supply port 206, a control orifice 208 and an output orifice 210 wherein the size of the supply port 206 is larger than output orifice 210 so that the requisite control over the power flow may be exercised by the vortex amplifier means 194 in the manner previously described above. The vortex amplifier means 194 of FIG. 4 acts directly to control the rate at which motivating fluid passed into an intermediate stage of the rotating equipment 20 via output orifice 210, as well as the rate of withdrawal from the rotating equipment 20 via line 202. The control orifice 208 of the vortex amplifier means 194 is connected to the flow passage 204 of the transducer-distributor means 192 whereby the control signal present therein determines the vortex generated within the vortex amplifier means 194 and hence the magnitude of the power flow at the output orifice 210.

In the operation of the embodiment of the control apparatus illustrated in FIG. 4, when the rotating equipment being controlled is energized, the tachometer-generator combination 2 will energize the power supply means 6 in the manner previously explained with regard to the FIG. 1 embodiment. The power supply means 6, thus energized will in turn supply operating power to the converter means 4, the controller means 8 and to the set point control means 38. The converter means 4 receives an output from the coil 28 which senses the rotational speed of the generator portion 22 of the tachometer-generator combination 2. The converter means 4 may take any form of device which produces an electrical signal output, the magnitude of which is proportional to the frequency of the input thereto. The electrical signal from the converter means 4 representative of the rotational speed of the equipment is applied to the first input of the controller means 8 via the conductor indicated. The second input 40 to the controller means 8 is a signal level representative of the desired rate of rotation of the equipment previously selected by preadjusting the set point control means 38. The output of the controller means 8, as applied to the conductor 42, thus represents the difference, if any, between the actual rotational speed of the rotating equipment 20 and the desired rate thereof as determined by the setting of the set point 38. Accordingly, if no output is present on conductor 42, the control signal present in the flow passage 204 will remain constant whereupon and hence the vortex established in the vortex amplifier means 194 will remain unchanged. Thus under these conditions, the actual rotational speed of the rotating equipment will be controlled by the established vortex in the vortex amplifier means 194 which controls the rate of withdrawal through line 202 of the motivating fluid from rotating equipment 20 which is passed via supply line 206 to vortex amplifier means 194 to an intermediate stage of the rotating equipment 20 via line 210. However, if an output is present on the conductor 42, the transducer-distributor means 192 in response to the electrical signals applied thereto will appropriately regulate the control fluid flow to flow passage 208 to compensate for the condition detected. Therefore, if it is assumed that a condition is detected by the controller means 8 wherein the actual rotational speed is greater than the desired rotational speed; it will be seen that the magnitude of the control signal in flow passage 208 will be appropriately increased to thus increase the magnitude of the vortex in the vortex amplifier means 194 to decrease the quantity of supply fluid which may be admitted through lines 202 and 206 from an interstage of the rotating equipment 20 thereby reducing the quantity of fluid which is passing through the equipment 20 with a concomitant reduction in speed. Furthermore, when the actual rotational speed is less than the desired speed, the converse situation prevails, i.e., the vortex present in the vortex amplifier means 194 will be decreased to thus increase the quantity of motivating fluid which may pass from the rotating equipment 20 via vortex amplifier means 194 through lines 206 and 202 to thereby increase the speed of the rotating equipment.

Referring to FIG. 5 illustrating still another embodiment of the invention wherein minimum flow, anti-surge control is exercised on the rotating equipment, there is provided a control apparatus comprising orifice plates 502 and 504, flow meters 506 and 508; controllers 510 and 512, electrofluidic transducers 514 and 516, vortex amplifiers 518 and 520, and the rotary equipment 522 and 524. The rotary equipment 522 and 524 shown as being compressors, are arranged in tandem by shaft 526 and are driven by a turbine 528 through a gear train 530. The controllers 510 and 512, and the electrofluidic transducers 514 and 516 are essentially identical to the controllers and transducers disclosed in conjunction with other embodiments of this invention. The control apparatus of this embodiment, as hereinabove mentioned, functions to provide a safety factor relative to the blading arrangement of the compressors, since a reduction in the flow of fluid through the compressors may damage the blading arrangement of the compressors.

The minimum flow controlling portion of this embodiment of the invention functions in a manner similar as the minimum flow controlling portion of the embodiment described with reference to FIG. 3. The controller means 510 may take the same form of the controller means as was described in conjunction with the FIG. 3 embodiment of this invention and is energized at an electrical input connection (not shown) thereto by energy supplied by the power source means (not shown). A pressure differential detected across the orifice plate 502 present in the conduit 503 passes such information to the flow meter 506 which converts such signal to a frequency level which in turn is transmitted to the controller means 510 as a first input 507.

The controller means 510 is provided with set point control means (not shown). The set point control means applies a signal to the controller means 510 which is representative of the desired minimum rate of flow of the fluid through conduit 505. A signal indicative of the difference between such inputs is supplied to the electrofluidic transducer-distributor 514 which transduces the signal supplied thereto into a fluid signal representative of such difference. Since in the instant embodiment, it is desired to maintain substantially the total flow of a fluid through the conduit 505, unless the total flow (except for supply fluid) drops below the predetermined value as established by the set point control means at which conditions it is desired to pass (or recycle) the fluid through conduit 509 by appropriate valving (not shown). Consequently, when the flow of the fluid through the conduit 505 is above the predetermined minimum flow; a signal will issue from the controller means 510 indicating a difference between the predetermined minimum flow rate as set on a controller means 510 and the actual flow rate as sent to controller means 510 from the flow meter 506.

The flow passage 515 of the transducer means 514 is connected to the control port or orifice 517 of the vortex amplifier 518. The vortex amplifier means 518 is connected to the fluid supply system through line 509. Under the assumed condition that the flow rate through conduit 505 is above the minimum flow rate established by the set point, a signal is passed to transducer means 514 which results in a maximum flow of fluid to control port 517 establishing a radial pressure gradient in the vortex amplifier means 518 which minimizes the flow of supply fluid through conduit 509.

Should the flow rate through conduit 505 drop below the predetermined minimum flow rate set at the controller means, a signal indicative of such state will issue from the controller means 510 to the transducer 514, which signal will reduce the amount of control fluid passing through the flow passage 515 to the control port 517 of the vortex amplifier means 518 thereby increasing the amount of supply fluid which may pass through conduit 509 through the vortex amplifier means 518 to be combined in line 501 with the feed to the compressor 522. In this manner, a minimum flow of fluid through the blades of compressor 522 is maintained thereby minimizing the possibility of damaging the compressor.

Compressor 524 is similarly monitored to maintain a minimum flow of fluid through the blading arrangement. It can be readily appreciated that under normal condition the total quantity of fluid from compressor 522 is passed through conduit 505 to compressor 524 wherein the fluid is further compressed and passed through conduits 519, 521, 523, 527 and 529 to the process. A reduction in the flow through conduit 521 will result in a reduction in the amount of fluid issuing from compressor 524 through conduit 519.

The flow meter 508, controller 512, electrofluidic transducer means 516, and vortex amplifier means 520, function in the same manner as flow meter 506, controller 510, electrofluidic transducer means 514 and vortex amplifier means 518, respectively, which is the control apparatus of the rotating equipment 522 for maintaining a minimum flow rate through such rotating equipment 524.

Consequently, the set points (not shown) of the controller 512 are set for a minimum flow rate. The rate of flow of fluid passing through conduit 521 is continuously sensed (pressure differential) by the orifice plate 504 which transmits a signal to flow meter 508 through line 531. The flow meter converts such signal to an electrical signal which is passed to controller 512 via conductor 533. If the actual flow of fluid through conduit 521 be greater than the minimum flow, a corresponding signal will be transmitted to the electrofluidic transducer 516 which is supplied with a fluid through line 535. The vortex amplifier means 520 is supplied with a fluid through line 537. Since a minimum flow rate through the compressor 524 is provided by maximizing the amount of supply fluid which may pass through vortex amplifier means 520 through line 537, it will be understood that should the actual flow rate through line 521 be greater than the predetermined flow rate at the set points of controller 512, it is necessary to minimize the amount of supply fluid which may pass through vortex amplifier means 520. Thus, the fluid signal from electrofluidic transducer means 516 to the control orifice or port 539 of the vortex amplifier means 20 is maximized thereby establishing a large radial pressure gradient in the vortex amplifier means 520 which limits the amount of supply fluid which may pass through the amplifier means 520 from line 537 through conduit 541 to compressor 524.

Since the orifice plate 504 continuously monitors the flow rate through conduit 521, a reduction in the actual flow rate below the predetermined minimum flow rate (established by the set points of the controller 512) will result in a corresponding signal being passed to the electrofluidic transducer 516. A corresponding reduction in the flow of fluid to the control port 539 of the vortex amplifier means 520 reduces the radiant pressure gradient therein to permit a greater quantity of fluid to be passed from line 537 through vortex amplifier means 520 to compressor 524 via conduit 541 thereby compensating for the reduction in the quantity of fluid passing to compressor 524 through line 505 from compressor 522.

Figure 6:
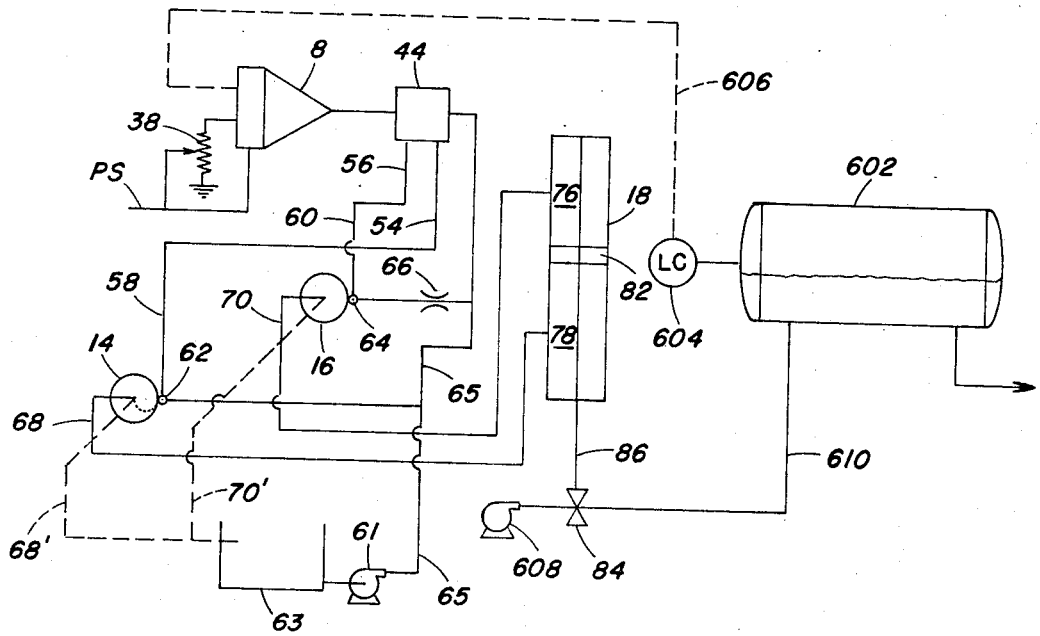
FIG. 6 illustrates a further embodiment of the control apparatus according to this invention wherein the level of a fluid in a vessel is controlled.

FIG. 6 is a schematic illustration of another embodiment of the control apparatus according to this invention wherein the level of a fluid in a vessel is controlled. As shown in FIG. 6, the control apparatus illustrated therein comprises a controller means 8, a transducer-distributor means 44, first and second vortex amplifier means 14 and 16, and a fluid operated valve controller means 18. In vessel 602 there is provided a fluid, the level of which is to be controlled. The controller means 8 and the set point controller means 38 are connected to a power supply means (not shown) by line PS and receive energizing potential therefrom. The controller means 8 is in receipt of a first input signal from level controller 604 via line 606 indicative of the actual level of fluid in the vessel 602. The set point controller means 38 is connected to the second input of the controller means 8 and applies a signal level to the controller means 8 which is representative of the desired level of fluid in the vessel 602. The signal indicative of a difference between the input to controller means 8 is supplied to the transducer-distributor 44 which transduces the signal supplied thereto into fluid signals representative of such difference.

Since in the instant embodiment, it is desired to maintain the level of fluid in the vessel 602, unless the level should drop below the predetermined value as established by the set point controller means 38 at which condition it is desired to open the valve 84 to permit fluid to flow to vessel 602 by pump 608 through line 610. Consequently, when the level of fluid in the vessel 602 is above the predetermined value; a signal will issue from the controller means 8 indicating a difference between the desired fluid level as set on controller means 8 and the actual fluid level as sent to controller means 8 from the level controller 604. The differential signal is transmitted to the transducer-distributor means 44, which may take the form of such similar devices described with reference to the previous Figures. The flow passages 54 and 56 of the transducer-distributor means 44 are connected to the control ports or orifices 58 and 60, respectively, of the vortex amplifier means 14 and 16, respectively.

Each of the vortex amplifier means 14 and 16 are connected to the system supply (pump 61 and tank 63) through line 65 to the supply ports 62 and 64, respectively, via variable restrictor 66. As each of the vortex amplifier means 14 and 16 are identical in structure, in the absence of differential signal on the control orifices 58 and 60, respectively, the power flow present at the output orifices 68 and 70, respectively thereof, is the same. The power flow present at the output orifice 70 of the vortex amplifier means 16 is applied to the chamber 76 of the valve controller means 18 to thereby exert a first force directed downwardly on the piston means 82. The power flow present at the output orifice 68 of the vortex amplifier means 14 is applied to the chamber 78 of the valve controller means 18 whereby a second force, directed upwardly is applied to an opposing surface of the piston means 82. The piston means 82 of the valve control means 18 is connected by a shaft 86 to valve 84.

Under the assumed condition that fluid level in the vessel 602 is above the level established by the set point 38, a signal is passed to transducer-distributor means 44 which results in an unequal apportionment of the fluid between flow passages 54 and 56, with the radial pressure gradient in the vortex amplifier means 16 being greater than the radial pressure gradient in the vortex amplifier means 14. Thus, the power flow present at the output orifice 70 of the vortex amplifier means 16 will be less than the power flow present at the output orifice 68 of the vortex amplifier means 14, thereby resulting in a greater force in chamber 78 than in chamber 76 of the valve controller means 18. This differential force causes the piston means 82 of the valve controller means 18 to be displaced upwardly to a position determined by the displacement limit of valve 84 to thereby maintain the valve 84 in a closed condition.

Should the fluid level in the vessel 602 drop below the predetermined level set at the controller means 8, a signal indicative of such state will issue from the controller means 8 to the transducer-distributor means 44, which signal will increase the amount of fluid subsequently passing through the flow passage 54 as compared to the condition where the fluid level is above the predetermined level. With an increase in the radial pressure gradient in the vortex amplifier means 14 accompanied by a decrease in the radial pressure gradient in the vortex amplifier means 16, the power flow present at the output orifice 68 of the vortex amplifier means 14 will be lessened with an increase in the power flow at the output orifice 70 of the vortex amplifier means 16. Consequently, the force of the fluid in the chamber 78 will be reduced while the force of the fluid in the chamber 76 is increased causing the piston means 82 to be displaced downwardly thereby opening the valve 84 operatively connected to the piston means 82 by rod 86 with fluid thereafter being passed to vessel 602 through conduit 610 by pump 608. The vortex amplifier means 14 and 16 of FIG. 6 are illustrated as being of the vented type wherein excess fluid is returned to the tank or reservoir 63 by lines 68' and 70'. It will be understood that the control apparatus as well as the apparatus controlled will be normally in a dynamic state (assuming use of the apparatus being controlled), i.e., that the valve 84 will assume a position between that of being either opened or closed.

Figure 7:
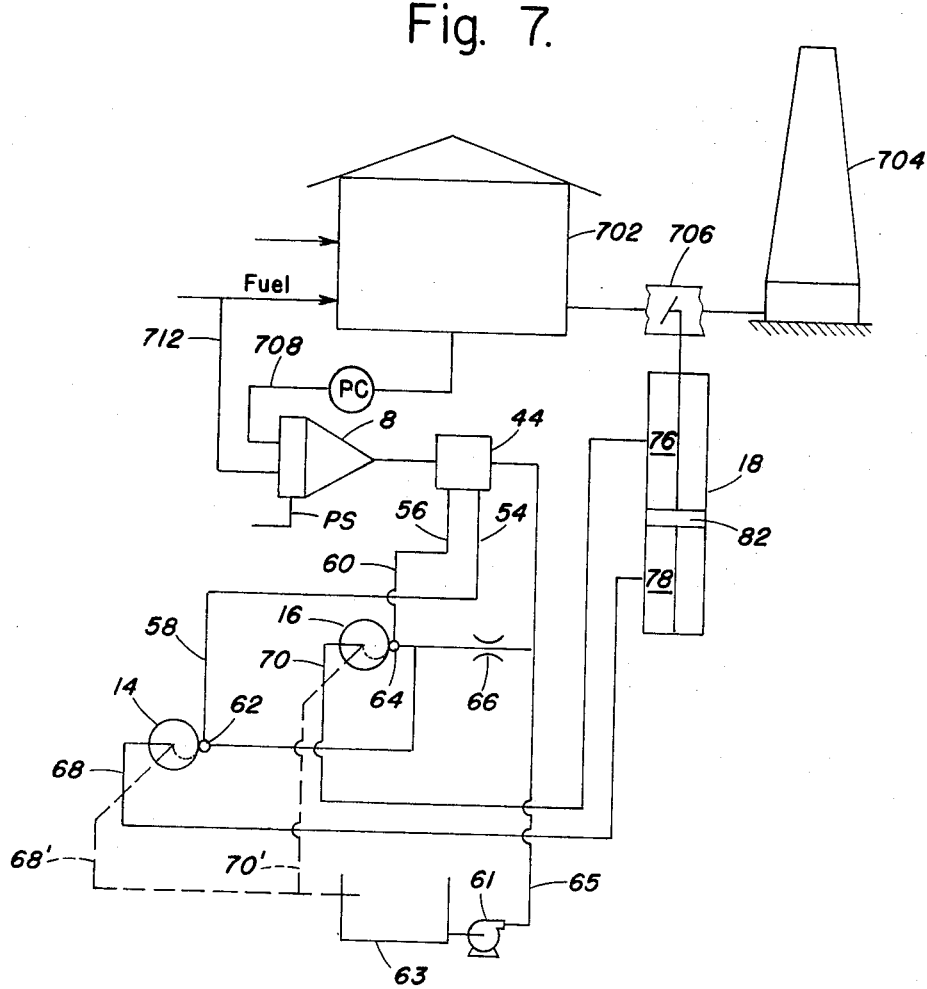
FIG. 7 illustrates another embodiment of the control apparatus in accordance with this invention wherein the draft to a heater is controlled.

Referring now to FIG. 7, there is illustrated still another embodiment of the invention wherein the amount of combustion supporting medium introduced into a heater 702 is regulated by the amount of combustion gases passed to a stack 704 under the control of a stack damper 706. The operation of the control apparatus, i.e., controller means 8, transducer-distributor means 44, vented vortex amplifier means 14 and 16, and valve controller means 18 is similar to that of FIG. 6 anent. The controller means 8 is connected to a power supply means (not shown) by line PS and receives a first input signal 708 which is indicative of the pressure within the heater 702. A second input signal 712 is passed to controller means 8 which is representative of the rate at which fuel is being introduced into the heater 702. The signals are compared to determine if there is a proper pressure level within the heater for such a specific fuel rate. If a proper relationship exists, an equal apportionment of fluid between the flow passages 54 and 56 to each vortex amplifier means will result with no change to the valve controller means 18. Should the fuel rate be decreased with a concomitant requirement of less combustion supporting medium, a signal is passed to the transducer-distributor means 44 which results in an unequal apportionment of the fluid between flow passages 54 and 56 with the radial pressure gradient in the vortex amplifier means 16 being greater than the radial pressure gradient in the vortex amplifier means 14. Thus, the power flow present at the output orifice 16 will be less than the power flow present at the output orifice 68 of the vortex amplifier means 14, thereby resulting in a greater force in chamber 78 than in chamber 76 of the valve controller means 18. Such differential force causes the piston 82 of the valve controller means 18 to be displaced upwardly to cause the damper to assume a more perpendicular position to thereby restrict the flow of combustion gases to the stack 704. A converse situation would produce the opposite result, i.e., opening of the damper valve 706.

It will be understood that the control apparatus of FIG. 7 is equally applicable to other heater applications wherein the valve controller means 18 is connected to a damper valve means of a heater apparatus, such as forced draft systems (damper control on discharge or suction side), and induced draft systems (damper control on discharge or suction side).

Figure 8:
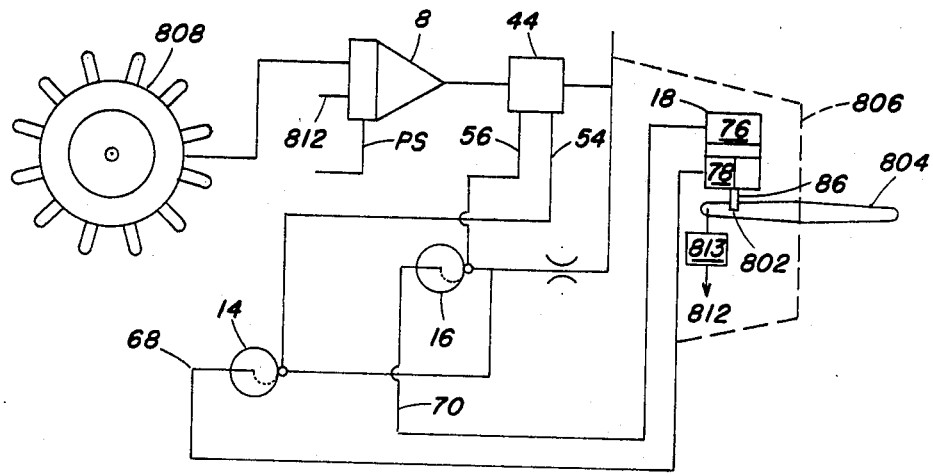
FIG. 8 illustrates still another embodiment of the control apparatus according to the invention wherein a rudder of a ship is controlled.

FIG. 8 illustrates another embodiment of the invention wherein the control apparatus functions to vary the angle of the rudder of a vessel rudder in response to movement of the helm of the vessel. As shown in FIG. 8, the control apparatus includes the controller means 8, the transducer-distributor means 44, vortex amplifier means 14 and 16, and valve controller means 18. The shaft 86 of the valve controller means 18 is connected to the rudder post 802 of a rudder 804. The aft end of the vessel is schematically illustrated by dotted line 806. The helm 808 of the vessel supplies a first input 810 to the controller means 8 representative of the displacement thereof from a reference point whereas a second input 812 is supplied to controller means 8 representative of the displacement of the rudder from the lengthwise axis of the vessel, such as by a servo mechanism 813. Assuming initially that the helm is positioned at a relative bearing of 0° (amidships) and the rudder is in coaxial alignment with the lengthwise axis of the vessel (amidships), there will be an equal apportionment of the fluid between flow passages 54 and 56 from transducer-distributor 44 with the piston 82 means being centrally disposed in the valve controller means 18. A movement of the helm clockwise to a relative 10° bearing (right 10° rudder) will cause a signal to pass to transducer-distributor means 44 which results in an unequal apportionment of the fluid between flow passages 54 and 56, with the radial pressure gradient in the vortex amplifier means 14 being greater than the radial pressure gradient in the vortex amplifier means 16. Thus, the power flow present at the output orifice 68 of the vortex amplifier means 14 will be less than the power flow present at the output orifice 70 of the vortex amplifier means 16, thereby resulting in a greater force in chamber 76 than in chamber 78 of the valve controller means 18. This differential force causes the piston 82 of the valve controller means 18 to be displaced downwardly thereby displacing the rudder counterclockwise about the rudder post 802. It will be understood that "right rudder" will cause the vessel to be directed to starboard or right notwithstanding the apparent left or counterclockwise motion of the rudder.

As the relative bearing of the rudder approaches that of the helm, the unequal apportionment of fluid between the flow passages 54 and 56 will diminish, eventually reaching a state where one coincides with the other. Movement of the helm counter-clockwise from such position to a relative 0° bearing will result in an unequal apportionment, and increase the amount of fluid subsequently passing through the flow passage 54. With an increase in the radial pressure gradient in the vortex amplifier means 16 accompanied by a decrease in the radial pressure gradient in the vortex amplifier means 14, the power flow present at the output orifice 70 of the vortex amplifier means 16 will be lessened with an increase in the power flow at the output orifice 68 of the vortex amplifier means 14. Consequently, the force of the fluid in the chamber 78 will be reduced while the force of the fluid in the chamber 76 is increased causing the piston 82 to be displaced upwardly thereby causing the rudder to move clockwise about the rudder post 802. It will be appreciated that the control assembly may be positioned in the area of the vessel in which the rudder post passes through the bottom of the vessel thereby eliminating mechanical linkage assemblies (normally found on small vessels) between the helm and the rudder assemblies, as well as the complex servo- and hydraulic assemblies found on large ships.

The valve controller means 18 of FIGS. 1 to 7 have been described as a cylinder and piston arrangement of the reciprocating type wherein a variance in pressure on either side of the piston is translated into a linear movement of the shaft. Other devices are available which operate on the basis of a pressure differential on either side of a vane member which may be translated into rotary movement. For example, a rotary piston disposed in a cylinder wherein a pressure differential on the piston is translated into a rotary movement of the shaft. It is understood that the valve controller means of this invention includes piston and cylinder assemblies wherein a pressure differential on either side of the piston is translated into a linear, rotary or other movement of the shaft for activating, stopping, monitoring the equipment to be controlled.

It is further appreciated that the control apparatus of this invention is applicable to almost any operation wherein reciprocating action may be used, per se, or translated into other movements, e.g., the rotational movement of a damping valve in a conduit or of a rudder. Thus, this invention may be used with any device where movement of the equipment from position A to position B can be achieved with the subsequent arresting of the movement of the equipment at position B by monitoring the change in state during movement thereof, and wherein the equipment may be similarly returned to position A, e.g., opening and closing of a door, changing the angle on an aileron, changing the angle of airplane flaps, web guide controlling and the like. It should also be noted that the fluid supply system (i.e., tank 63 and pump 65) for the control apparatus may be disposed adjacent the fluidic elements and may be combined in modular form with the control apparatus, such as illustrated in FIG. 6, to provide a unitary assembly. It is further contemplated to produce a self-contained unitary assembly comprised of the fluid supply system and control apparatus requiring a power supply and input terminals. Having such a self-contained or closed assembly will improve the efficiency of such a unit, since fluid contamination will be substantially reduced, if not eliminated, thereby decreasing turn-around frequency to clean conduits, etc., and to replace the fluid.

What is claimed is:

1. Apparatus for the control of equipment by reciprocating motion which comprises:
   sensor means operatively connected to said equipment and adapted to monitor a condition of the equipment;
   means for comparing the condition of said equipment as monitored by said sensor means with a desired reference, said means for comparing the condition of the equipment being operatively connected to said sensor means and adapted to provide an electrical output signal representative of a difference between the monitored condition of the equipment and said desired reference;
   vortex amplifier means;
   means for applying said electrical output signal representative of the difference between the monitored condition of the equipment and said desired reference to control the flow of said fluid to said vortex amplifier means; and
   valve means in fluid communication with said vortex amplifier means to receive a flow of fluid therefrom which fluid flow is translated into reciprocating motion for controlling said equipment until said difference between the monitored condition of the equipment and said desired reference reaches a preselected value.

2. The apparatus as defined in claim 1 wherein said sensor means monitors the pressure in a heater assembly.

3. The apparatus as defined in claim 2 wherein the valve means controls the admission of a combustion supporting gas to said heater assembly.

4. An integrated assembly for providing movement for the operation of equipment which comprises:
   a housing defining a chamber and having a displaceable piston member dividing the chamber into a plurality of zones and a shaft connected to said piston member, said shaft providing said movement for operation of said equipment;
   a plurality of vortex amplifier means, one of said plurality of vortex amplifier means being in fluid communication with an associated one of said plurality of zones, each of said vortex amplifier means including a control port and a supply port;
   means for supplying a constant flow of fluid to said supply port of each of said plurality of vortex amplifier means;
   distributing means for applying an independent control stream of fluid to each control port of said plurality of vortex amplifier means in accordance with a control signal applied to said distributing means;
   means for applying a control signal to said distributing means in response to differential signals representative of a difference between an existing position of said displaceable piston member and a desired position thereof;
   a fluid reservoir; and
   a pump means, said pump means being in fluid communication with said fluid reservoir said distributing means and said supply ports of said vortex amplifier means.

5. The assembly as defined in claim 4 wherein two zones are formed in said housing, each zone being in fluid communication with a single vortex amplifier means.

6. The assembly as defined in claim 4 wherein said vortex amplifier means are provided with venting port means, said venting port means being in fluid communication with said fluid reservoir.

7. The assembly as defined in claim 4 wherein a change in position of the equipment is detected and a resulting signal transmitted to the distributing means.

8. The assembly as defined in claim 4 wherein movement of said piston results in a rotary movement of said shaft.

* * * * *